(12) United States Patent
Chuong et al.

(10) Patent No.: US 9,850,780 B2
(45) Date of Patent: Dec. 26, 2017

(54) PLATE FOR DIRECTING FLOW AND FILM COOLING OF COMPONENTS

(71) Applicant: United Technologies Corporation, Hartford, CT (US)

(72) Inventors: Conway Chuong, Manchester, CT (US); Matthew Budnick, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1608 days.

(21) Appl. No.: 13/730,898

(22) Filed: Dec. 29, 2012

(65) Prior Publication Data
US 2014/0248152 A1 Sep. 4, 2014

(51) Int. Cl.
F01D 5/18 (2006.01)
F01D 25/24 (2006.01)
F01D 25/16 (2006.01)

(52) U.S. Cl.
CPC ......... F01D 25/246 (2013.01); F01D 25/162 (2013.01); F05D 2260/201 (2013.01); Y02T 50/675 (2013.01)

(58) Field of Classification Search
CPC ................. F01D 25/162; F01D 25/246; F05D 2260/201; Y02T 50/675
See application file for complete search history.

(56) References Cited

U.S. PATENT DOCUMENTS

| 2,124,108 A | 7/1938 | Grece |
| 3,576,328 A | 4/1971 | Vose |
| 3,736,069 A | 5/1973 | Beam et al. |
| 3,970,319 A | 7/1976 | Carroll et al. |
| 4,088,422 A | 5/1978 | Martin |
| 4,114,248 A | 9/1978 | Smith et al. |
| 4,309,145 A | 1/1982 | Viola |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,815,933 A | 3/1989 | Hansel et al. |
| 4,920,742 A | 5/1990 | Nash et al. |
| 4,987,736 A | 1/1991 | Ciokajlo et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |

(Continued)

OTHER PUBLICATIONS

International Searching Authority, PCT Notification of Transmittal of the International Search Report and the Written Opinion, dated Sep. 25, 2014, 12 pages.

Primary Examiner — Igor Kershteyn
(74) Attorney, Agent, or Firm — Kinney & Lange, P.A.

(57) ABSTRACT

An assembly includes a gas turbine engine component and a plate. The plate is spaced from a surface of the component and generally conforms to the shape of the surface. The plate and component form a passageway that allows for passage of a secondary gas flow between the component and the plate.

14 Claims, 5 Drawing Sheets

(56) References Cited

U.S. PATENT DOCUMENTS

| | | | |
|---|---|---|---|
| 5,188,507 A | 2/1993 | Sweeney | |
| 5,211,541 A | 5/1993 | Fledderjohn et al. | |
| 5,236,302 A | 8/1993 | Weisgerber et al. | |
| 5,246,295 A | 9/1993 | Ide | |
| 5,252,026 A | 10/1993 | Shepherd | |
| 5,273,397 A | 12/1993 | Czachor et al. | |
| 5,316,437 A | 5/1994 | Czachor | |
| 5,338,154 A | 8/1994 | Meade et al. | |
| 5,370,402 A | 12/1994 | Gardner et al. | |
| 5,385,409 A | 1/1995 | Ide | |
| 5,401,036 A | 3/1995 | Basu | |
| 5,474,305 A | 12/1995 | Flower | |
| 5,558,341 A | 9/1996 | McNickle et al. | |
| 5,593,277 A | 1/1997 | Proctor et al. | |
| 5,632,493 A | 5/1997 | Gardner | |
| 5,755,445 A | 5/1998 | Arora | |
| 5,911,400 A | 6/1999 | Niethammer et al. | |
| 5,961,279 A | 10/1999 | Ingistov | |
| 6,196,550 B1 | 3/2001 | Arora et al. | |
| 6,343,912 B1 | 2/2002 | Manteiga et al. | |
| 6,352,404 B1 | 3/2002 | Czachor et al. | |
| 6,364,316 B1 | 4/2002 | Arora | |
| 6,439,841 B1 | 8/2002 | Bosel | |
| 6,601,853 B2 | 8/2003 | Inoue | |
| 6,619,030 B1 | 9/2003 | Seda et al. | |
| 6,637,751 B2 | 10/2003 | Aksit et al. | |
| 6,638,013 B2 | 10/2003 | Nguyen et al. | |
| 6,652,229 B2 | 11/2003 | Lu | |
| 6,736,401 B2 | 5/2004 | Chung et al. | |
| 6,776,573 B2* | 8/2004 | Arilla | F01D 5/081 415/115 |
| 6,805,356 B2 | 10/2004 | Inoue | |
| 6,811,154 B2 | 11/2004 | Proctor et al. | |
| 6,935,631 B2 | 8/2005 | Inoue | |
| 6,983,608 B2 | 1/2006 | Allen, Jr. et al. | |
| 6,997,673 B2 | 2/2006 | Morris et al. | |
| 7,025,565 B2 | 4/2006 | Urso et al. | |
| 7,094,026 B2 | 8/2006 | Coign et al. | |
| 7,185,499 B2 | 3/2007 | Chereau et al. | |
| 7,238,008 B2 | 7/2007 | Bobo et al. | |
| 7,246,993 B2 | 7/2007 | Bolms et al. | |
| 7,367,567 B2 | 5/2008 | Farah et al. | |
| 7,371,044 B2 | 5/2008 | Nereim | |
| 7,631,879 B2 | 12/2009 | Diantonio | |
| 7,735,833 B2 | 6/2010 | Braun et al. | |
| 7,798,768 B2 | 9/2010 | Strain et al. | |
| 8,069,648 B2 | 12/2011 | Snyder et al. | |
| 8,083,465 B2 | 12/2011 | Herbst et al. | |
| 8,152,451 B2 | 4/2012 | Manteiga et al. | |
| 8,221,071 B2 | 7/2012 | Wojno et al. | |
| 8,245,518 B2 | 8/2012 | Durocher et al. | |
| 8,727,705 B2 | 5/2014 | Inomata et al. | |
| 8,920,113 B2* | 12/2014 | Hudson | F01D 25/16 415/134 |
| 9,316,153 B2* | 4/2016 | Patat | F01D 9/02 |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2005/0046113 A1 | 3/2005 | Inoue | |
| 2007/0025854 A1 | 2/2007 | Moore et al. | |
| 2010/0132371 A1 | 6/2010 | Durocher et al. | |
| 2010/0132374 A1 | 6/2010 | Manteiga et al. | |
| 2010/0132377 A1 | 6/2010 | Durocher et al. | |
| 2010/0307165 A1 | 12/2010 | Wong et al. | |
| 2011/0000223 A1 | 1/2011 | Russberg | |
| 2011/0027068 A1 | 2/2011 | Floyd et al. | |
| 2011/0214433 A1 | 9/2011 | Feindel et al. | |
| 2011/0262277 A1 | 10/2011 | Sjoqvist et al. | |
| 2012/0023968 A1 | 2/2012 | Shteyman et al. | |
| 2012/0111023 A1 | 5/2012 | Sjoqvist et al. | |
| 2012/0192567 A1 | 8/2012 | Rice et al. | |

\* cited by examiner

PLATE FOR DIRECTING FLOW AND FILM COOLING OF COMPONENTS

BACKGROUND

The invention relates to gas turbine engines, and more particularly to the purging of cavities and the film cooling of components within gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Components such as finger seals are used in gas turbine engines and seal off cavities from one another. In some instances, these cavities may become dead spaces filled with relatively warm stagnant air that is not desirable.

SUMMARY

An assembly includes a gas turbine engine component and a plate. The plate is spaced from a surface of the component and generally conforms to the shape of the surface. The plate and component form a passageway that allows for passage of a secondary gas flow between the component and the plate.

An assembly for a gas turbine engine includes an outer radial casing and a plate. The plate is attached to the outer radial casing and extends along and generally conforms with a surface of the casing to form a passageway that allows for a secondary gas flow between the casing and the plate.

An assembly for a gas turbine engine includes a first casing, a fairing, and a plate. The fairing is disposed within the casing to form a main gas flow path for the gas turbine engine. The fairing has a rib that extends therefrom. The plate is mounted to the rib and extends along a surface of the component to form a passageway therealong. The passageway allows for a secondary gas flow between the component and the plate.

DETAILED DESCRIPTION

This application discloses the use of a plate to direct a secondary air flow for purging dead cavities within gas turbine engines. Additionally, the plate can be used to direct air flow to provide for film cooling along a surface of a component to which the plate is mounted. The cooling provided by the arrangement described can be used to control deflection of the hardware as desired.

Figure 1:
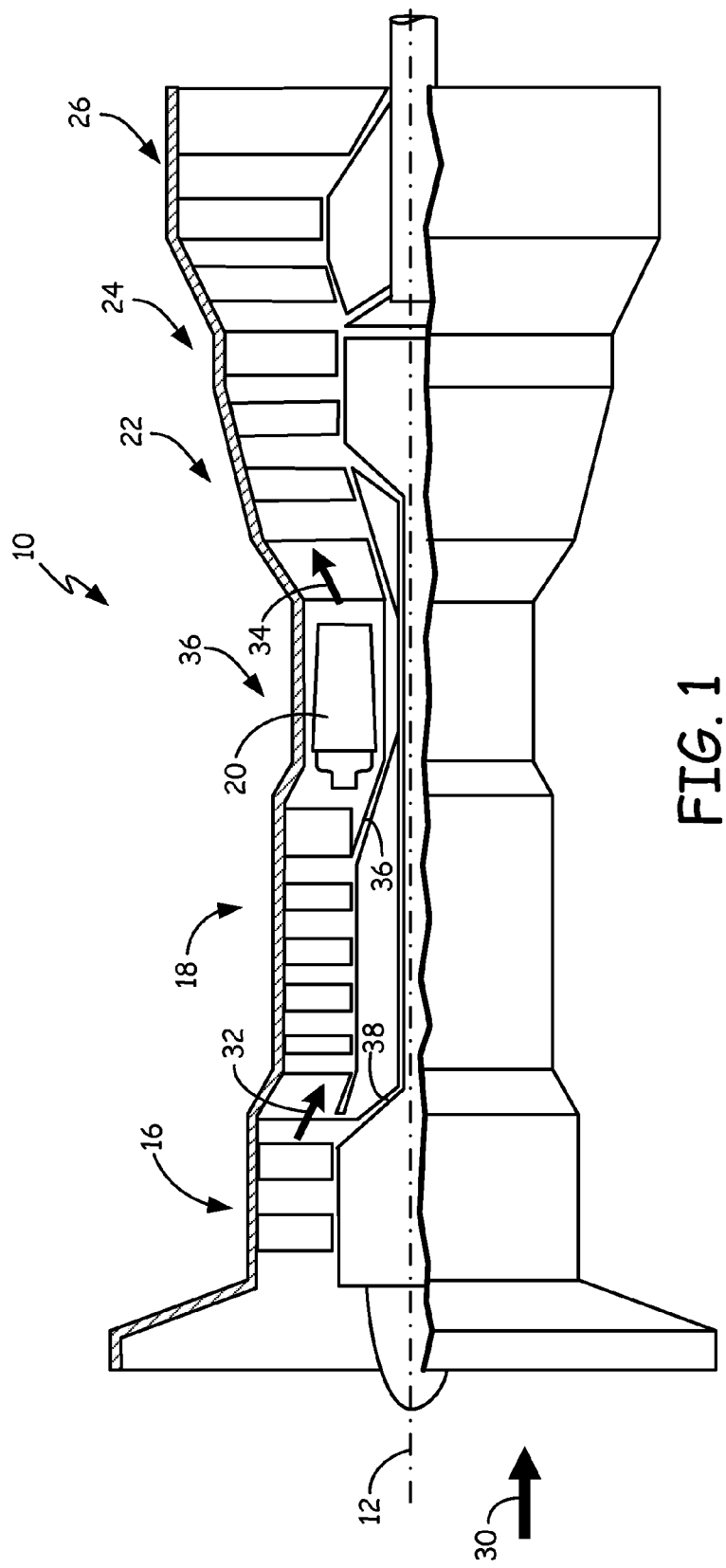
FIG. 1 is an industrial turbine cross-section.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2A:
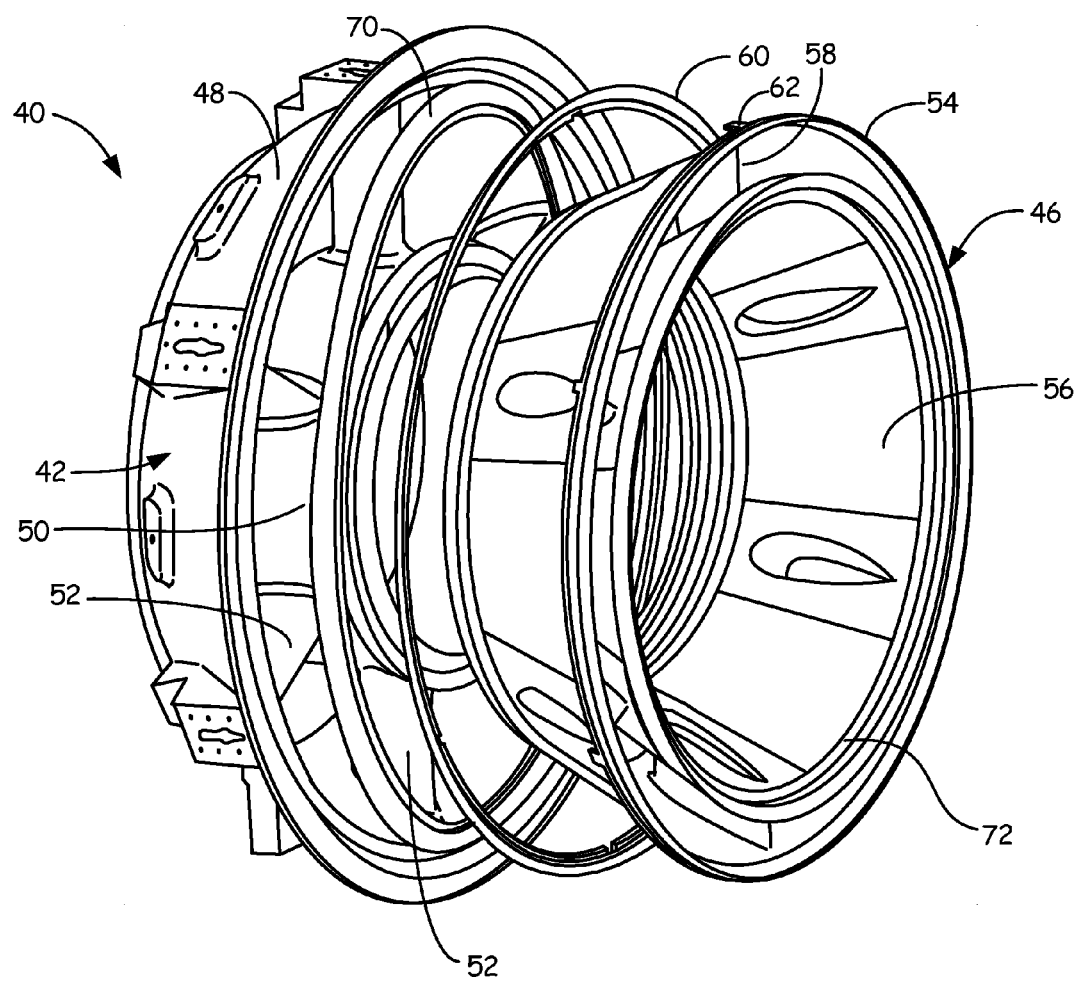
FIG. 2A is an exploded view of an assembly including a fairing, a flange, and a frame.
Figure 2B:
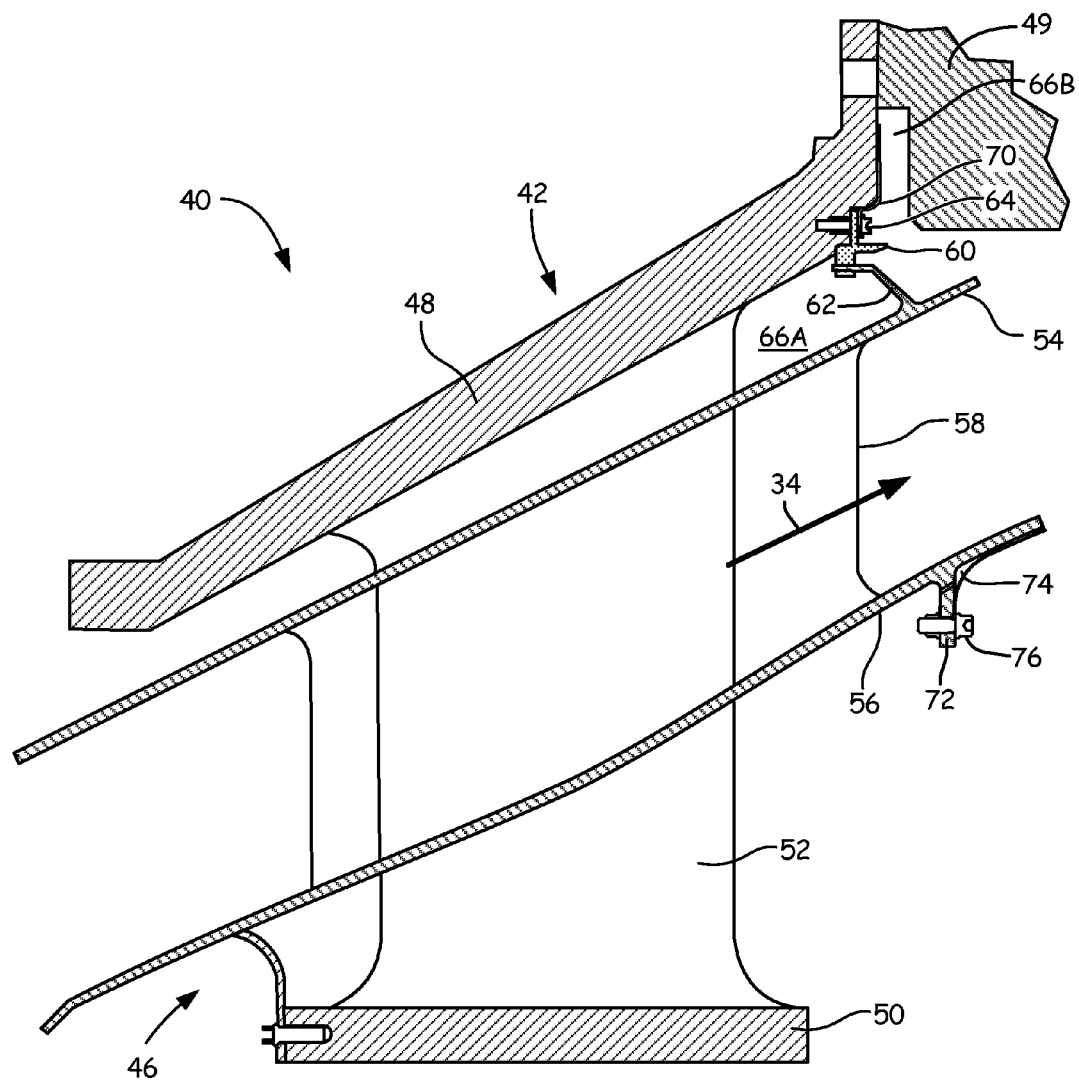
FIG. 2B is a cross-section of the assembly including the fairing, the flange, plates, and the frame arranged together.

FIG. 2A shows an exploded view of assembly 40 with frame 42, fairing 46, and first plate 70. FIG. 2B shows a cross-section of assembly 40 with first plate 70 installed on an aft end of frame 42 and second plate 74 installed on an aft end of fairing 46. Assembly 40 includes frame 42, fairing 46, mount 60, first plate 70, and second plate 74 (shown in FIG. 2B only). Frame 42 includes outer radial casing 48, inner radial casing 50, and struts 52. Fairing 46 includes outer radial platform 54, inner radial platform 56, strut liners 58, first rib 62, and second rib 72.

Frame 42 comprises a stator component of gas turbine engine 10 (FIG. 1) and can form portions of compressor sections 16 and 18 and/or turbine sections 22 and 24. Fairing 46 is connected to the frame 42 when installed. Additionally, when installed fairing 46 is disposed within the frame 42 to form the main gas flow path for a portion of gas turbine engine 10 through which combustion gases 34 can flow.

As illustrated in FIGS. 2A and 2B, outer radial casing 48 of frame 42 is conically shaped and forms a portion of the casing of gas turbine engine 10 (FIG. 1), for example, in high pressure turbine section 22. Inner radial casing 50 is disposed generally radially inward of outer radial casing 48 and is connected thereto by struts 52.

Fairing 46 is adapted to be disposed within frame 42 between outer radial casing 48 and inner radial casing 50. Outer radial platform 54 of fairing 46 has a generally conical shape. First rib 62 extends from an aft end of outer radial platform 54 toward outer radial casing 48. Second rib 72 extends from an aft end of inner radial platform 56. Inner radial platform 56 has a generally conical shape and is spaced from outer radial platform 54 by strut liners 58. Strut liners 58 are adapted to be disposed around struts 52 of frame 42 when fairing 46 is assembled on frame 42. As discussed previously, outer radial platform 54, inner radial platform 56, and strut liners 58, form the main gas flow path for a portion of gas turbine engine 10 when assembled.

Outer radial casing 48 abuts and is affixed to a second outer radial casing 49 of another module of gas turbine engine 10 (FIG. 1). In the embodiment of FIGS. 2A and 2B, mount 60 is mounted to an aft end of outer radial casing 48 adjacent second outer radial casing 49 (FIG. 2B). In the embodiment shown, mount 60 comprises a flange shaped ring. Slots in mount 60 receive portions of first rib 62 therein. Mount 60 is attached to outer radial casing 48 by fasteners 64 (only one is shown in FIG. 2B).

In some embodiments, mount 60 acts as a seal land or seal mounting component for various types of seals such as finger seals (not shown). The seals and mount 60 act to separate first cavity 66A from second cavity 66B within gas turbine engine 10. First cavity 66A is formed between outer radial casing 48 and outer radial platform 54. Second cavity 66B is formed between aft end of outer radial casing 48 and forward end of inner radial casing 49.

First plate 70 is affixed to aft end of outer radial casing 48 and to mount 60 by fasteners 64. First plate 70 interfaces with second cavity 66B along a free end. First plate 70 is spaced from aft surface of outer radial casing 48 and generally conforms to the shape of aft surface. In one embodiment, first plate 70 can be formed of a sheet metal that is fabricated to generally conform to the shape of aft surface of outer radial casing 48. In another embodiment, first plate 70 can be formed from a turned ring.

Second rib 72 extends generally radially from a non-main flow path side of inner radial platform 56. Second plate 74 is mounted to second rib 72 by fasteners 76 (only one is shown in FIG. 2B). Similar to first plate 70, second plate 74 is spaced from inner surface of inner radial platform 56 and generally conforms to the shape of inner surface of inner radial platform 56. In one embodiment, second plate 74 can be formed of a sheet metal that is fabricated to generally conform to the shape of inner surface. In another embodiment, second plate 74 can be formed from a turned ring.

Figure 3:
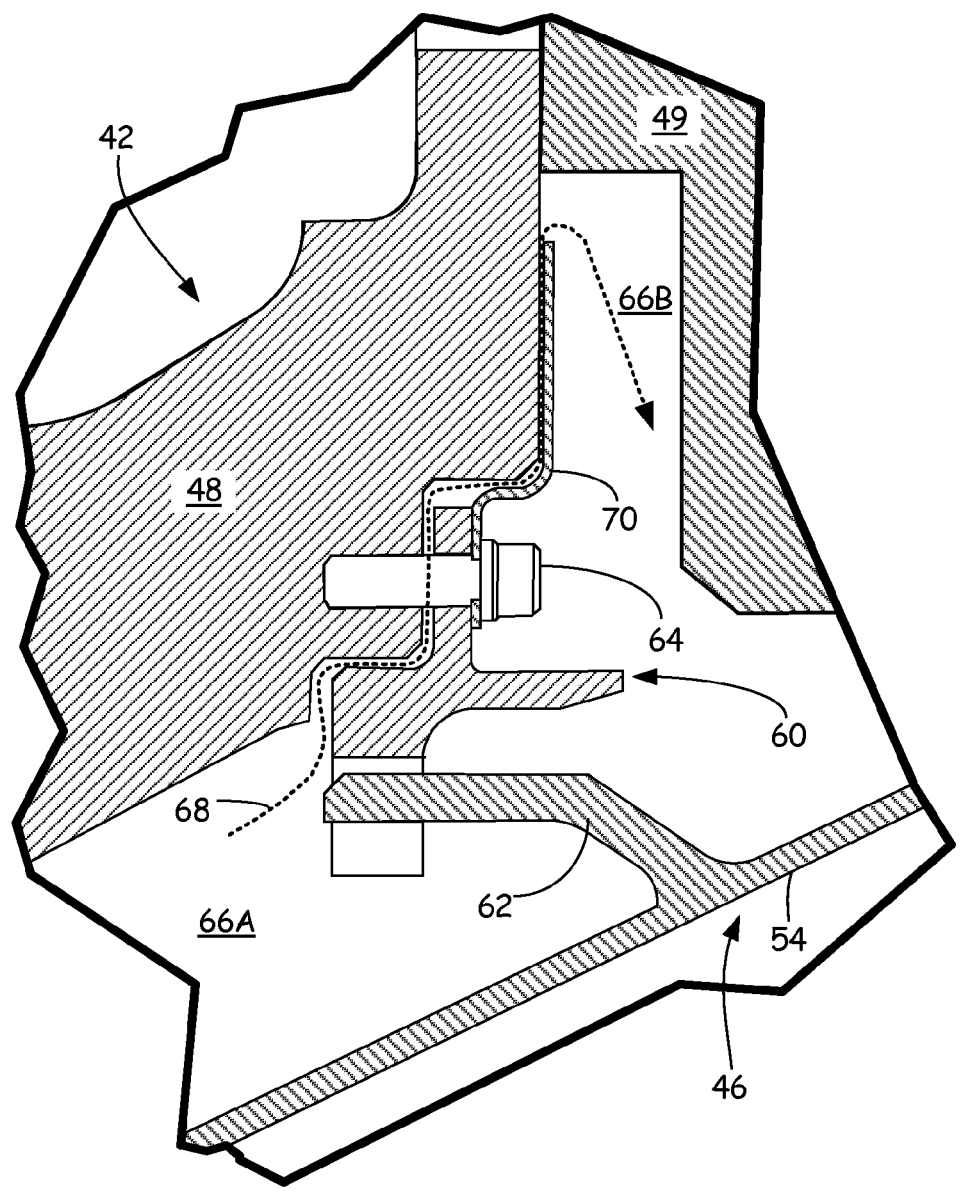
FIG. 3 is an enlarged cross-sectional view of one embodiment of the plate that allows for film cooling along a portion of the frame.

FIG. 3 shows an enlarged cross-sectional view of one embodiment of first plate 70 affixed to aft end of frame 42 via mount 60. FIG. 3 illustrates frame 42, fairing 46, outer radial casing 48, second outer radial casing 49, outer radial platform 54, mount 60, and first rib 62, fasteners 64 (only on is shown in FIG. 3), first cavity 66A, second cavity 66B, and secondary flow 68.

In FIG. 3, mount 60 is affixed to aft end of outer radial casing 48 by fasteners 64. Fasteners 64 additionally hold first plate 70 to mount 60. First plate 70 extends from mount 60 and is spaced from aft surface of outer radial casing 48. Thus, first plate 70 is fixed at a first end and is free at a second end.

First cavity 66A is disposed between outer radial platform 54 and outer radial casing 48. Second cavity 66B is disposed between an aft portion of outer radial casing 48 and a forward portion of second outer radial casing 49. Mount 60 and seals (not shown) separate first cavity 66A from second cavity 66B. Secondary air flow 68 travels between outer radial casing 48 and mount 60 via passages or clearances instead of passing between mount 60 and seals (not shown). First plate 70 is spaced from aft surface of outer radial casing 48 to form a passage. Secondary air flow 68 (after exiting from between mount 60 and outer radial casing 48) travels along this passage between first plate 70 and aft surface. Secondary air flow 68 exits to second cavity 66B along an outer radial extent of first plate 70. Thus, the spaced arrangement of first plate 70 relative to aft surface of outer radial casing 48 allows for passage of secondary gas flow 68 from first cavity 66A to second cavity 66B.

The passage formed by the spaced arrangement of first plate 70 relative to aft surface allows for air flow between first cavity 66A and second cavity 66B. Thus, first cavity 66A and second cavity 66B can be purged with air flow if desired. Additionally, first plate 70 allows air flow to film cool the aft surface of outer radial casing 48 that interfaces with first plate 70. Providing film cooling increases the operation life of outer radial casing 48.

Figure 4A:
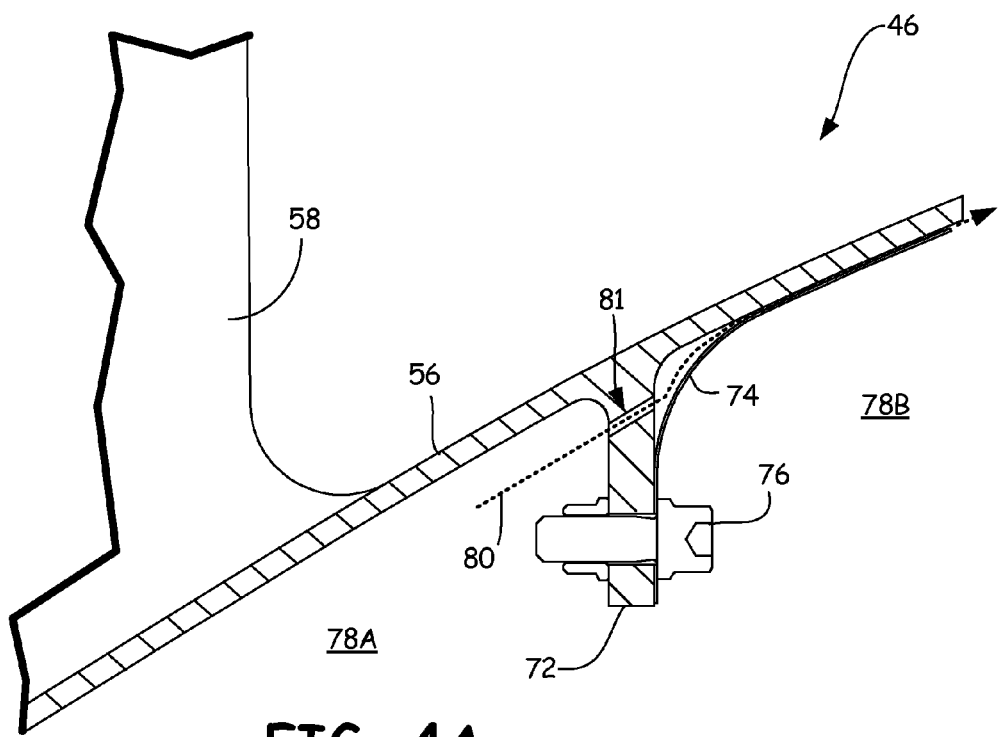
FIG. 4A is an enlarged cross-sectional view of another embodiment of the plate mounted to the fairing to allow for film cooling along a portion of the fairing.
Figure 4B:
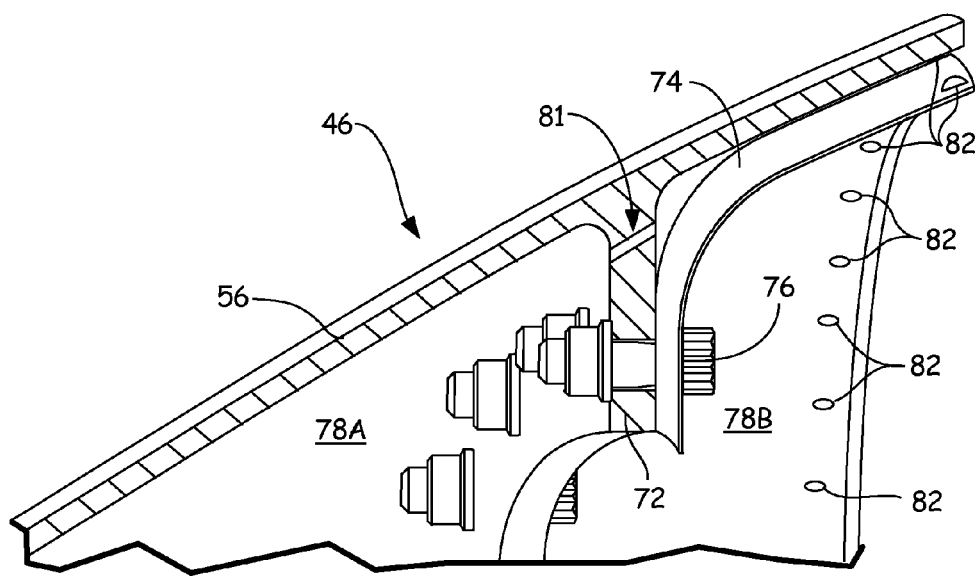
FIG. 4B is an enlarged cross-sectional view of the fairing and plate of FIG. 4A.

FIG. 4A shows an enlarged cross-sectional view of one embodiment of second plate 74 mounted to second rib 72 of fairing 46. FIG. 4B shows a perspective view of inner radial platform 56, second rib 72, and second plate 74. FIGS. 4A and 4B illustrate fairing 46 with inner radial platform 56 and strut liner 58 (shown in FIG. 4A only), second rib 72, second plate 74, and fasteners 76. Second rib 72 includes apertures 81. Second plate 74 includes standoffs 82.

Second rib 72 extends generally inward radially from a non-main flow path side of inner radial platform 56. Second plate 74 is affixed to second rib 72 via fasteners 76. Second plate 74 extends rearward toward an aft end of fairing 46 and is spaced from inner surface of inner radial platform 56. Second plate 74 generally conforms to the shape of inner surface of inner radial platform 56 and second rib 72. In FIG. 4B, second plate 74 is shown with standoffs 82 projecting from an aft end thereof. In the embodiment shown, standoffs 82 comprise projections such as dimples that contact inner surface of inner radial platform 56 to keep second plate 74 spaced from inner radial platform 56. This arrangement allows for the passage of secondary air flow 80 therebetween.

First cavity 78A is disposed radially inwards of inner radial platform 56 and forward of second rib 72. Second cavity 78B is disposed radially inwards of inner radial platform 56 and generally aft of second rib 72 and second plate 74. In the embodiment shown, second cavity 78B extends aft of fairing 46. As shown in FIGS. 4A and 4B, second rib 72 generally separates first cavity 78A from second cavity 78B. In other embodiments, additional components such as seals and seal supports may separate first cavity 78A from second cavity 78B.

Secondary air flow 80 travels through second rib 72 via apertures 81. Second plate 74 is spaced from inner surface of inner radial platform 56 to form a passage. Secondary air flow 80 (after exiting from apertures 81) travels along this passage between second plate 74 and inner surface of inner radial platform 56. Secondary air flow 68 exits to second cavity 78B along an aft end of second plate 74 and inner radial platform 56. Thus, the spaced arrangement of second plate 74 relative to inner radial platform 56 allows for passage of secondary gas flow 80 from first cavity 78A to second cavity 78B.

The passage formed by the spaced arrangement of second plate 74 relative to inner radial platform 56 allows for air flow between first cavity 78A and second cavity 78B. Thus, first cavity 78A and second cavity 78B can be purged with air flow if desired. Additionally, second plate 74 allows air flow to film cool surfaces of fairing 46 that interface with second plate 74. Providing film cooling increases the operation life of fairing 46. Additionally, the cooling provided by the arrangement described can be used to control deflection of the hardware as desired.

This application discloses the use of a plate to direct a secondary air flow for purging dead cavities within gas turbine engines. Additionally, the plate can be used to direct air flow to provide for film cooling along a surface of a component to which the plate is mounted. The cooling provided by the arrangement described can be used to control deflection of the hardware as desired.

Discussion of Possible Embodiments

The following are non-exclusive descriptions of possible embodiments of the present invention.

An assembly includes a gas turbine engine component and a plate. The plate is spaced from a surface of the component and generally conforms to the shape of the surface. The plate and component form a passageway that allows for passage of a secondary gas flow between the component and the plate.

The assembly of the preceding paragraph can optionally include, additionally and/or alternatively, any one or more of the following features, configurations and/or additional components:

a mount affixed to the component and wherein a portion of the plate is affixed to the mount;

the component comprises a turbine frame;

the plate is mounted to an outer radial casing of the turbine frame;

the component comprises a fairing that defines a main gas flow path of the gas turbine engine;

the fairing includes a rib with one or more apertures therein that allow for the secondary air flow to enter the passageway between the plate and the fairing;

the plate has a plurality of standoffs that contact the surface of the component and space the plate from the surface; and the plate is fixed at a first end and is free at a second end.

An assembly for a gas turbine engine includes an outer radial casing and a plate. The plate is attached to the outer radial casing and extends along and generally conforms with a surface of the casing to form a passageway that allows for a secondary gas flow between the casing and the plate.

The assembly of the preceding paragraph can optionally include, additionally and/or alternatively, any one or more of the following features, configurations and/or additional components:

the outer radial casing comprises a portion of a turbine frame;

the plate has a plurality of standoffs that contact the surface of the casing and space the plate from the surface; and the plate is fixed at a first end and is free at a second end.

An assembly for a gas turbine engine includes a first casing, a fairing, and a plate. The fairing is disposed within the casing to form a main gas flow path for the gas turbine engine. The fairing has a rib that extends therefrom. The plate is mounted to the rib and extends along a surface of the component to form a passageway therealong. The passageway allows for a secondary gas flow between the component and the plate.

The assembly of the preceding paragraph can optionally include, additionally and/or alternatively, any one or more of the following features, configurations and/or additional components:

the rib has one or more apertures therein that allow the secondary air to flow to enter the passageway between the plate and the fairing;

the rib extends away from the main gas flow path of the gas turbine engine;

the plate has a plurality of projects that contact the surface of the component to standoff the plate from the surface;

the plate is fixed at a first end and is free at a second end.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
a gas turbine engine component; and
a plate spaced from a surface of the component and generally conforming to the shape of the surface, wherein the plate and the component form a passageway that allows for passage of a secondary gas flow between the component and the plate, and wherein the plate has a plurality of standoffs that contact the surface of the component to space the plate from the surface.

2. The assembly of claim 1, further comprising a mount affixed to the component and wherein a portion of the plate is affixed to the mount.

3. The assembly of claim 1, wherein the component comprises a turbine frame.

4. The assembly of claim 3, wherein the plate is mounted to an outer radial casing of the turbine frame.

5. The assembly of claim 1, wherein the component comprises a fairing that defines a main gas flow path of the gas turbine engine.

6. The assembly of claim 5, wherein the fairing includes a rib with one or more apertures therein that allow for the secondary air flow to enter the passageway between the plate and the fairing.

7. The assembly of claim 1, wherein the plate is fixed with respect to the component at a first end and is free with respect to the component at a second end.

8. An assembly for a gas turbine engine, comprising:
an outer radial casing; and
a plate attached to the outer radial casing and extending along and generally conforming with a surface of the casing to form a passageway that allows for a secondary gas flow between the casing and the plate, and wherein the plate has a plurality of standoffs that contact the surface of the casing to space the plate from the surface.

9. The assembly of claim 8, wherein the outer radial casing comprises a portion of a turbine frame.

10. The assembly of claim 8, wherein the plate is fixed with respect to the outer radial casing at a first end and is free with respect to the outer radial casing at a second end.

11. An assembly for a gas turbine engine, comprising:
a first casing;
a fairing disposed within the casing to form a main gas flow path for the gas turbine engine, wherein the fairing has a rib that extends therefrom; and
a plate mounted to the rib and extending along a surface of a component to form a passageway therealong, wherein the passageway allows for a secondary gas flow between the component and the plate, and wherein the rib has one or more apertures therein that allow the secondary air to flow into the passageway between the plate and the fairing.

12. The assembly of claim 11, wherein the rib extends away from the main gas flow path of the gas turbine engine.

13. The assembly of claim 11, wherein the plate has a plurality of projections that contact the surface of the component to standoff the plate from the surface.

14. The assembly of claim 11, wherein the plate is fixed with respect to the rib at a first end and is free with respect to the rib at a second end.

* * * * *